Dec. 4, 1962   P. M. STIGLIC ET AL   3,066,653
HOT GAS SERVO SYSTEM
Filed Feb. 8, 1960   3 Sheets-Sheet 1

Inventors
Paul M. Stiglic
Daniel J. Shramo
Charles R. Hehmeyer by Hill, Sherman, Meroni, Gross & Simpson Attys.

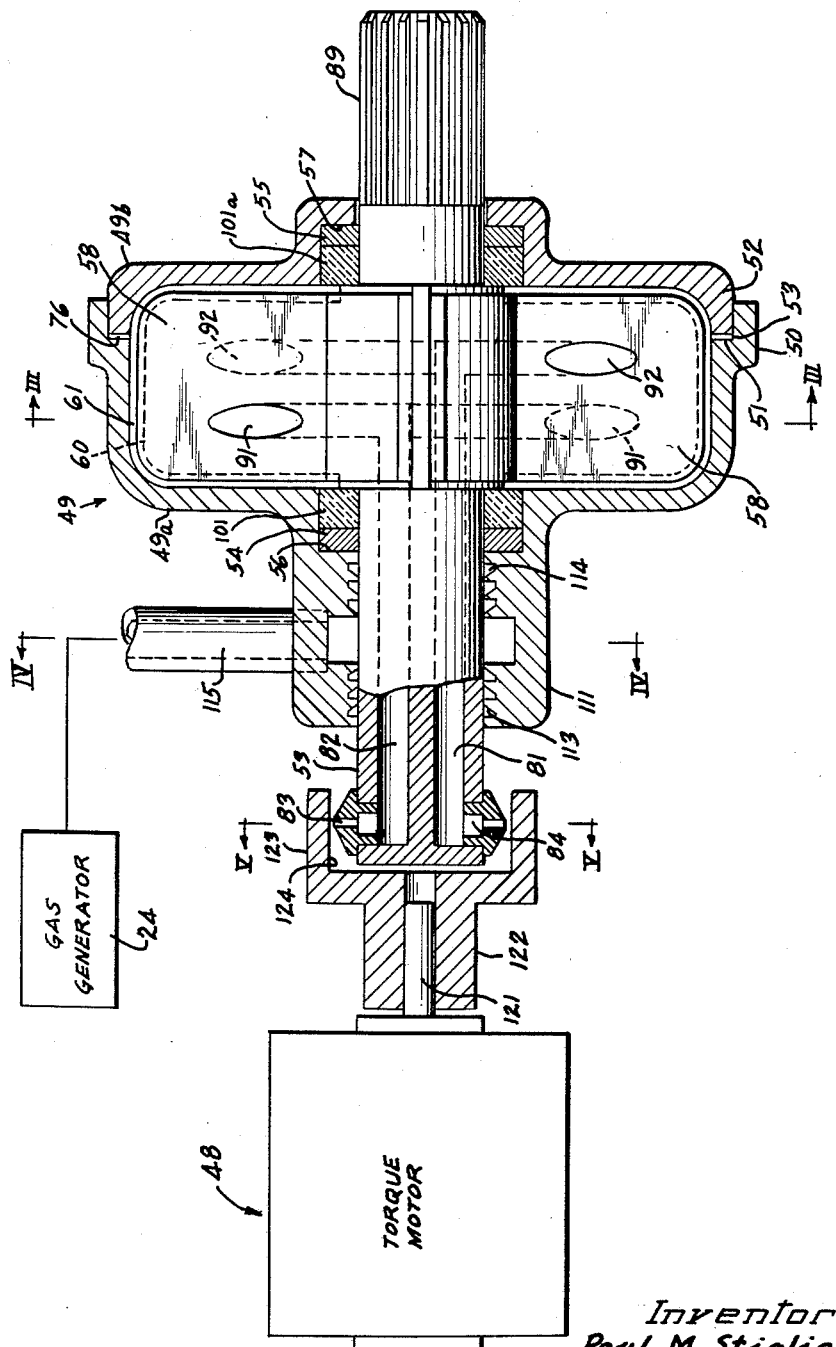

Dec. 4, 1962   P. M. STIGLIC ET AL   3,066,653
HOT GAS SERVO SYSTEM
Filed Feb. 8, 1960   3 Sheets-Sheet 3
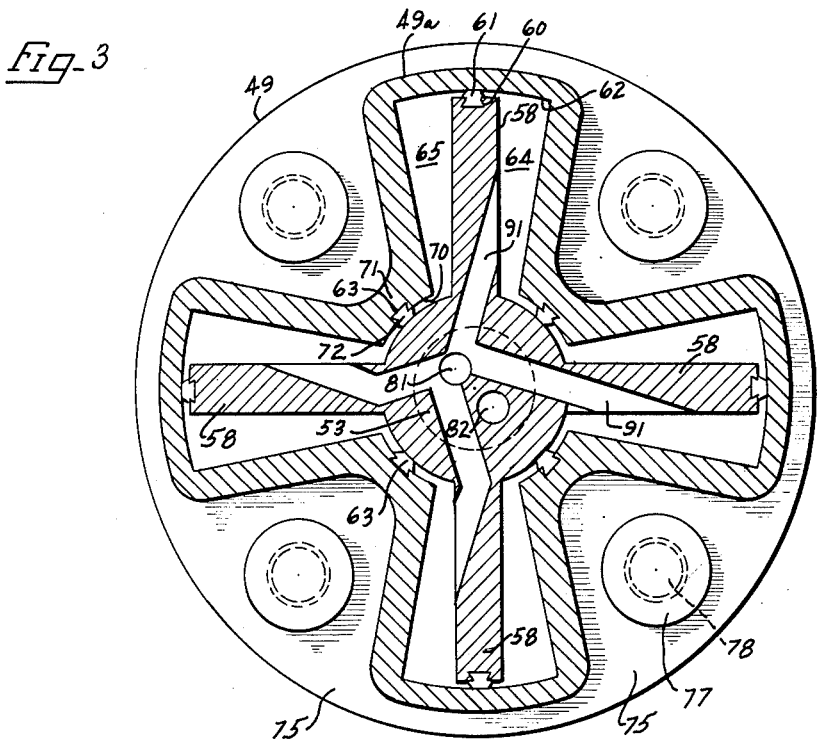
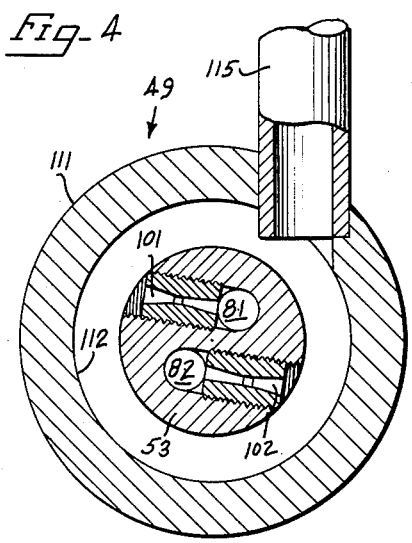
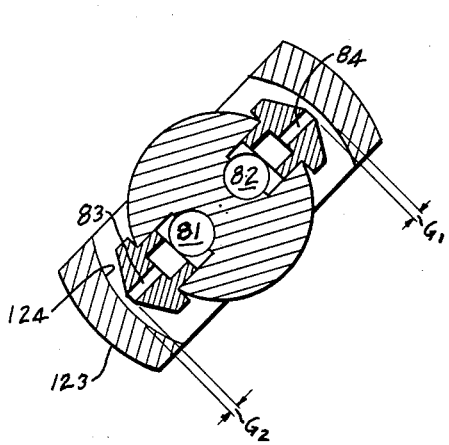
Inventors
Paul M. Stiglic
Daniel J. Shramo
Charles R. Hehmeyer ns
3,066,653
HOT GAS SERVO SYSTEM Paul M. Stiglic, Wickliffe, and Daniel J. Shramo and Charles R. Hehmeyer, Willoughby, Ohio, assignors to Thompson Ramo Wooldridge Inc., Cleveland, Ohio, a corporation of Ohio
Filed Feb. 8, 1960, Ser. No. 7,420
10 Claims. (Cl. 121—41)

The present invention relates broadly to rockets, guided missiles and air and space borne vehicles, and is more particularly concerned with hot gas servo system assemblies having special utility in the performance of the functions of pitch, yaw and roll control, as well as related applications exemplified by movement of control surfaces, of vector directional and roll control nozzles and a movement of thrust reversal means into an exhaust gas stream of a thrust nozzle.

Heretofore difficulty has been encountered generally in the selection, design and application of servo systems wherein vehicle directional and roll control means are to be actuated thereby in response to signals received from a remote source.

Employment of hot gas servo systems in preference to hydraulic systems has the decided advantage of simplicity and the attendant advantages of higher reliability and lighter weight in that the rotary actuator of a hot gas servo system is operated directly by hot gases and the turbine, pump, valves, filters, return lines, sump and fluid inventory assemblies required for hydraulic systems are unnecessary.

Hot gas servo systems previously utilized employ a continuous flow of hot gases from an auxiliary gas supply source to maintain a condition of pressure equilibrium in a plurality of chambers defined by the housing of an actuator shaft and a plurality of radially extending vanes depending from an actuator shaft positioned in the housing.

In hot gas servo systems of this type the actuator shaft is connected to a vehicle flight control surface for movement thereof. When gas pressure in the vane chambers is in equilibrium the respective vanes positoned therein and depending from the actuator shaft are held in a stationary position. However, should a pressure differential be produced in the vane chambers, the vanes will move in the direction of low pressure and cause rotation of the actuator shaft thus moving the vehicle flight control surface in the desired direction. Movement of the actuator shaft will continue until a conditon of pressure equilibrium is again restored in the vane chambers whereupon the actuator shaft will have returned to its normally inoperative position and thereby return the corresponding vehicle flight control surface to its normally inoperative position.

To produce a pressure differential in the vane chambers, control means may be provided to restrict flow of the gases exhausting from the chambers through discharge passages formed in the actuator shaft.

Means heretofore utilized for restricting such flow have taken the form of a motor driven shaft having cam means thereon positioned in close proximity to the end of the actuator shaft from which gas is discharged through the passages therein.

Gas continuously flows from the supply source through passages formed in the actuator housing into the vane chambers through the actuator shaft passages and discharges against the cammed surfaces of the motor thereby maintaining a condition of pressure equilibrium in the vane chambers.

When an energizing signal is transimitted to the motor from a remote source, such as the vehicle autopilot system, the motor shaft is caused to rotate, and, in rotating, either of the cam surfaces on the end thereof will effectively block one of the actuator shaft exhaust passages behind the direction of rotation and open the exhaust area ahead of the direction of rotation.

The pressure differential thus produced is sensed in the actuator shaft exhaust passages and a corresponding pressure differential created in the vane chambers. The actuator shaft vanes then move in the direction of low pressure causing rotation of the actuator shaft and the flight control surface.

However, because of the proximity of the servo system to the rocket engine with its attendant high temperature operating environment and because of the elevated temperature of the gases utilized in operating the servo system actuator means of the prior art, uneven thermal expansion between the actuator shaft and the frame supporting the actuator means and torque motor may seriously effect operation of the cam means mounted on the motor shaft. For example, the actuator shaft, when heated by exhaust gases, may cause linear expansion of the shaft towards the cam means on the motor shaft and reduce the predetermined exhaust gap distance therebetween. Hence gas pressure within the actuator means may thereby be raised to approximate the servo system supply pressure and destroy the regulating function of the motor shaft and cam means mounted thereon.

By employment of our invention which provides an assembly wherein the exhaust passages in the actuator shaft are terminally realigned and the end of the actuator shaft positioned in spaced relation to cup-shaped means mounted on the motor shaft and having an inner cammed surface, we provided simple and compact means for controlling operation of the actuator means uneffected by thermally produced linear expansion of the actuator shaft.

Another ever present problem in space borne vehicle design is the weight factor. Heretofore an auxiliary gas generator, preferably a solid propellant, has been utilized as the gas supply source for hot gas servo systems, primarily because main combustion chamber propellants, either liquid or solid, contain eroding impurities, such as aluminum particles, and produce gases of a high temperature flowing at a low pressure. The erodants will clog the miniature actuator gas passages and the temperature and pressure condition are reversed from these considered feasible for actuator application. It will be appreciated then that utilization of the gases exhausting from the main combustion chamber would provide a weight-saving factor, if such problems could be solved.

One modification of our invention eliminates the requirement for auxiliary gas generators to the extent that we provide apparatus for filtering gases being supplied for operation of a servo system from either an auxiliary gas generator or the main combustion chamber.

The hot gas servo systems known to be utilized required a plurality of gas passages extending into each vane chamber for continuously introducing gas from the supply source thereto. Additionally, transverse passages in the actuator shaft were required for continuously exhausting gas from these vane chambers. Continuous flow of gases through the system maintains the chambers at undesirable high temperatures.

By our invention we eliminate the necessity for positioning gas inlet passages in the actuator housing and employ only a pair of axially spaced actuator shaft passages to introduce gas to transverse passages in the actuator shaft and therefrom into the vane chambers to produce a pressure responsive condition therein. The pair of axially aligned passages also provide means for supplying gas to a control device on the torque motor shaft. In this static-type gas passaging arrangement, gases do not continuously flow through the chambers and under steady pressure conditions, low chamber temperature rise results. Thus, the actuator unit may be constructed more compactly and simply.

It is therefore an object of the present invention to provide a hot gas servo system adapted to be connected to either a solid propellant auxiliary gas generator or to a main combustion chamber and is particularly suitable for effecting tilting movement of a single main thrust nozzle for rocket, guided missile and space borne vehicle yaw or pitch control, as well as related applications.

Another object of the present invention is to provide a rotary gas actuator characterized by a plurality of chambers receiving vanes mounted by a shaft having formed therein a pair of gas flow passages communicating with the vane chambers and a gas supply source and opening in one end of the shaft in close proximity to shaft means of a motor or the like mounting control means, whereby either passage of the actuator shaft is subject to being essentially closed by the motor shaft mounted means to create a condition of pressure unbalance in the vane chambers and thereby effect rotation of the actuator shaft.

Another object of this invention is to provide actuator control means substantially unaffected by thermally produced linear expansion of the rotary actuator shaft of a hot gas servo system.

A still further object of this invention is to provide a servo system which may utilize gases generated in a main combustion chamber or auxiliary gas generator to operate a servo system.

A further object of this invention is to provide gas filtering means whereby gases carrying impurities flowing under pressure from a supply source into the actuator means may be effectively filtered.

Another object of the present invention is the provision of compact and simple hot gas servo systems economical in construction and efficient in operation.

These and other objects and advantages of the present invention will become more apparent during the course of the following description, particularly when taken in connection with the accompanying drawing wherein:

FIGURE 2 is a sectional view taken longitudinally through a preferred form of actuator means;

FIGURE 3 is a sectional view of the rotary section of the actuator means of FIGURE 2 taken along the lines III—III of FIGURE 2;

FIGURE 4 is a sectional view of the supply gas inlet swirl chamber taken along lines IV—IV of FIGURE 2; and FIGURE 5 is a sectional view of the valve control means taken through lines V—V of FIGURE 2.

Figure 1:
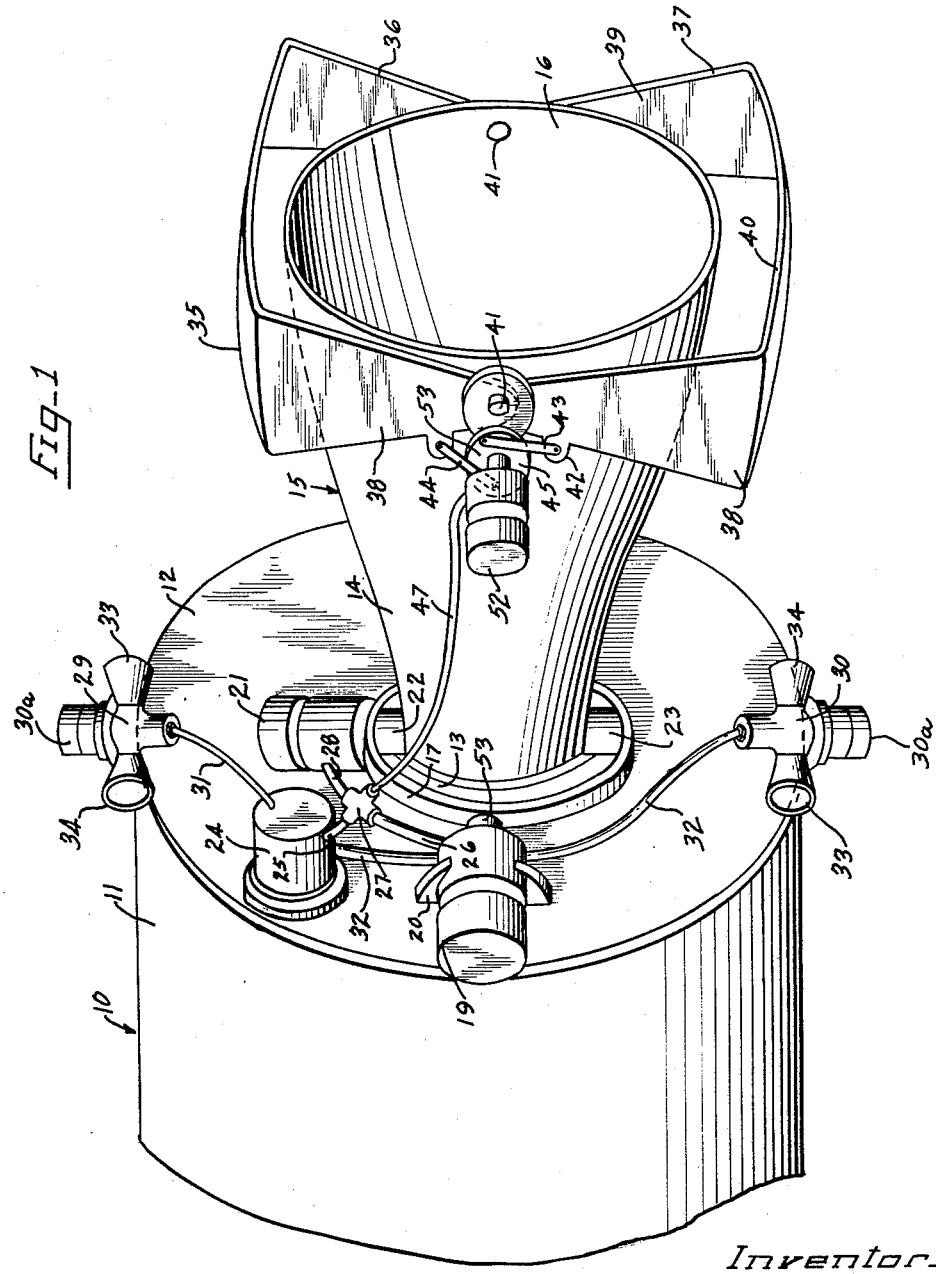
FIGURE 1 is a side elevational view of one end of the rocket engine mounting thereon actuator means constructed in accordance with the principles of this invention.

Briefly stated, the present invention is directed to gas actuator means of the rotary type provided with a housing supporting therein a passaged shaft to be located in close adjacency to shaft means of a torque motor or related driving means. The latter housing defines interiorly a plurality of circumferentially spaced vane chambers receiving radially extending vanes mounted on the actuator shaft.

The actuator shaft has a pair of passages, each comprising a plurality of radial portions communicating with opposite surfaces of the vanes and an axial portion connecting with the radial portions and near one end communicating with a radially extending passage for discharging gases against a cammed surface on the end of a modified torque motor shaft.

An electrical signal from the autopilot system rotates the modified torque motor shaft to effectively block one of the passages in the actuator shaft thereby creating a greater pressure in one set of vane chambers than in the other in order to rotate the actuator shaft.

While the applications for the actuator means of this invention are varied and numerous, the actuator shaft may be connected to gimbal means and the rocket engine nozzle to tilt the same for pitch or yaw control, or the actuator shaft may be connected with thrust reversal means. Other applications and the structural features of the actuator will become more apparent as the description now proceeds.

A particularly suitable environment of the actuator means of this invention is in association with the rocket engine designated generally in FIGURE 1 by the numeral 10, provided with a generally cylindrical housing 11 defining interiorly a combustion chamber and mounting an end wall 12 at the exhaust end or hot side of the engine 10. The end wall is provided with an opening generally centrally thereof, as indicated by the numeral 13, to receive therein for tiltable movement neck portion 14 of a single main thrust nozzle 15, which may be of the general frusto-conical shape shown and extending axially outwardly from the engine housing 11. Exhaust gases are discharged from the nozzle 15 through a relatively wide mouth or discharge portion 16.

The nozzle 15 tilts through an angle about +10° or −10° with respect to the longitudinal axis of the housing 11 and with respect to a transverse axis intersecting the housing longitudinal axis. In the position of the rocket engine 10 shown in FIGURE 1, the longitudinal axis is also the horizontal axis, and the transverse axis is the vertical axis, and will be designated as such during the following description.

The neck portion 14 of the nozzle 15 is supported by the end wall portions surrounding the opening 13, and circumferentially spaced in surrounding relation to the neck portion 14 is a gimbal ring 17. To effect tiltable movement of the nozzle 15 about a horizontal axis for pitch control, the gimbal ring 17 connects with shaft means 53 rotated by actuator means 19 attached by flanged means 20 to the housing end wall 12.

Yaw control, on the other hand, is accomplished by utilization of actuator means 21, preferably of the same character as the actuator means 19. The actuator 21 is supported by the gimbal ring 17 at a location circumferentially spaced about 90° from the shaft connection 53 of the actuator 19 with the gimbal means 17. The actuator 21 is provided with the shaft (not shown) of the same character as the shaft 53 of the actuator means 19, and said actuator shaft connects with a stub shaft 22 rigid with the nozzle neck portion and rotatable with respect to the gimbal means 17.

At a diametrically opposed location on the nozzle neck portion 14, and essentially in alignment with the vertical or transverse axis of the rocket engine housing 11, there is provided a second stub shaft 23 which rotates upon the inner diameter of the gimbal ring 17 and is suitably secured to the nozzle neck portion 14. If desired, the stub shaft 23 may be replaced by the rotatable shaft of the actuator means 21.

Supported by the end wall 12 with the housing 11 at diametrically opposed locations and essentially in alignment with the stub shafts 22 and 23 are a pair of roll control nozzle means 29 and 30. These nozzles may take various forms and the structural details thereof form no part of the present application.

However, each nozzle 29 and 30 may embody oppositely facing nozzle portions 33 and 34, one of which is selectively opened by action of torque motor means 30a operating a valve assembly within the nozzle 29 or 30 to provide a flow passage from inlet 31 to either of the nozzle members 33 or 34. The torque motor 30a receives an electrical signal from the rocket autopilot system to open either of the nozzle members 33 or 34, and the torque motors for the nozzles 29 and 30 are reversed so that thrust is provided in the same direction to rotate the rocket. As for example, to roll the rocket in a clockwise direction, the nozzle member 34 of each roll control nozzle 29 and 30 exhausts hot gases.

To drive the actuators 19 and 21 for pitch and yaw control purposes, to provide thrust for the roll control nozzles 29 and 30 through connections 31 and 32, and to operate a companion actuator 52 when thrust reversal means are provided, the rocket engine 10 may mount gas generator means 24 which may be in the form of a tank or container supported by the end wall 12 of the housing 11. The gas generator houses a propellant which preferably is of the solid type, and experience to date indicates that a nitroguanidine triple base composition is highly desirable.

The use of a gas generator 24 solely for the purpose of driving the three actuator means 19, 21 and 52 and to provide a gas supply to the roll control nozzles 29 and 30, is shown in the preferred embodiment; however, it is to be understood that the three actuator means and the roll control nozzle might be driven by the main propellant gases, adequate provision being made for the pressure and temperature conditions associated with utilization of main propellant gases.

The propellant contained in the gas generator 24 may be ignited in any suitable manner, and ignition means of the squib type may be employed for this purpose. To direct the gases of the generator 24 to the actuators 19, 21 and 52, a main conduit or connection 26 is provided leading to a four-way connecting member 27 from which branch connections 25, 26 and 28 are taken to the actuator means housing 19, 21 and 52, respectively.

If desired, the rocket engine 10 of FIGURE 1 may embody therein thrust reversal means generally indicated by the numeral 35 and mounted by the single main thrust nozzle 15 along the longitudinal axis thereof and inwardly of the mouth portion 16. Such means may comprise a pair of clam shell members 36 and 37, each being provided with a pair of spaced generally flat side wall portions 38 and 39 connected by a curved arcuate end portion 40. The side portions 38 and 39 of each clam shell member 36 and 37 are apertured adjacent their inner ends for receiving pin means 41, and outwardly of the pin means each side portion 38 is formed with ear 42, and to said ears there are connected link arms 43 and 44 pinned or otherwise secured to a circular disk 45. The disk member 45 receives the shaft 53 of the actuator 52 for rotation when an electrical signal is received by the actuator means 52 from the autopilot system. Rotation of the actuator shaft 53 causes corresponding rotation of the disk member 45 to move the clam shell members 36 and 37 into an open or closed position. Specifically, clockwise rotation of the shaft 53 and disk member 45 translates the link arms 43 and 44 to move the clam shell members 36 and 37 rearwardly to a closed or partially closed position, at which time the link arms 43 and 44 are extended essentially rearwardly. If required, the thrust reversal means 35 may employ in association therewith, suitable stop means in the form of abutment blocks or the like which may be attached to the thrust nozzle to limit the extent of open movement of the clam shell members 36 and 37.

The present application is more specifically directed to the provision of actuator means in housings 19, 21 and 52 for accomplishment of one or more of the functions of pitch and yaw control and thrust reversal, and to actuator means embodying essentially the structure features shown in FIGURES 2, 3, 4 and 5 of the drawing. It is, of course, appreciated that the actuator means 19, 21 and 52 are identical in construction, and accordingly, the description now to follow will be directed to the actuator means 19.

As appears in FIGURE 2, wherein the actuator assembly is shown as removed from its housing 19, the actuator assembly comprises a torque motor portion 48 and actuator portion 49. The portion 49 includes a housing 49a with a control cylindrical chamber from which radiates four wedge-shaped chamber finger extensions of the housing. A vaned rotor is rotatably mounted in the housing. The rotor includes an actuator shaft supported inwardly of opposed ends thereof by bearing means 54 and 55 carried in recessed hubs of the housing 49. These bearings are of the preloaded angular contact type in order to allow for radial growth of the housing and shaft, and still provide accurate concentricity of the rotating and stationary assemblies. The bearing means are maintained in position in abutment with shoulders 56 and 57 of the hubs respectively and hold sealing means 101 and 101a firmly in place.

Inwardly of its opposite ends and on an integral portion of increased diameter, actuator shaft 53 has brazed or otherwise suitably secured thereto four radially extending vanes 58 rotatable between adjacent surfaces of a plurality of chambers defined by the actuator portion of housing 49a illustrated in FIGURE 3 as being of cuneiform or wedge-shaped configuration.

Formed in the outer surface of each vane 58 is a peripheral recess 60 indicated by the dotted line in FIGURE 2 which is adapted to receive peripherally extending seal means 61 of suitable material which may be press-fitted therein. Seal means 61 have a curved outer surface complementary to surfaces 62 of actuator housing 49a and are positioned in recess 60 to contact the surface of housing 49a to effectively prevent gas leakage from chamber 64 across the vane outer boundary to the chamber 65 without interfering with movement of vanes 58 during operation.

As appears in FIGURE 3, similar but axially extending recesses 63 are conveniently located in each surface 70 of the inner arciform sections 71 of housing 49a to receive a plurality of complementary sealing means 72 of suitable material in press-fit relation therewith. The outer surface of seal means 72 are complementarily shaped to contact the outer surface of actuator shaft 53 and prevent gas leakage across the surface boundary thereof without interfering with movement of shaft 53 during operation.

Housing portion 49 may be constructed of two sections 49a and 49b for ease of assembly. A raised annular flange 50 on housing section 49a is adapted to provide an inner shoulder 51 to receive inturned portion 52 of actuator housing portion 49a. A suitable seal means 76 is positioned therebetween. Web portion 75 of housing section 49a carries bored bosses 77 communicating with complementary bores of housing section 49b through which means 78, such as bolts, secures housing sections 49a and 49b firmly together (FIGURE 3). Thus seal means 61, 72 and 76, when assembled, provide a plurality of gas-tight chambers 64 and 65.

Internally, actuator shaft 53 has formed therein a pair of axially extending radially spaced gas passages 81 and 82 respectively. Gas passage 81 communicates inwardly of one end of actuator shaft 53 with a radially extending outlet passage 83 and gas passage 82 communicates inwardly of the same end of actuator shaft 53 with a radially extending outlet passage 84 as shown in FIGURE 2. Radial outlet passages 83 and 84 are coaxially aligned for purposes hereinafter explained.

As appears in FIGURES 2 and 3, axial passage 82 communicates inwardly of the other end of actuator shaft 53 with transverse chamber inlet passages 91 adapted to introduce gas in the chambers 64 and axial passage 82 communicates with transverse passages 92 to introduce gas into chamber 65.

Inwardly of both ends of actuator shaft 53 are positioned a pair of radially extending gas inlet passages 101 and 102 as appears in FIGURE 4. As shown, passages 101 and 102 may be of venturi construction and removably secured as by threads to actuator shaft 53. Inlet passage 101 communicates with axially extending actuator shaft gas passage 81 and inlet passage 102 communicates with axially extending actuator shaft gas passage 82.

Actuator housing section 49 carries an integral hub 111 having formed therein a cylindrical swirl chamber 112 through which actuator shaft 53 centrally extends in communication therewith. Seal means 113 and 114 are provided to prevent gas leakage from gas-tight chamber 112 along actuator shaft 53. Gas inlet passages 101 and 102 in actuator shaft 53 communicate with chamber 112. A main gas inlet conduit 115 which extends through the actuator housing 19 and actuator hub 111 connects a suitable gas generator source 24 shown in block form in FIGURE 2 to the interior of hub swirl chamber 112.

Torque motor shaft 121 carries or has formed integral therewith a sleeve 122 having a generally cylindrical end portion 123, cup-shaped in construction, and having formed therein an eccentric or cammed inner surface 124.

When assembled for operation, torque motor shaft 121 and actuator shaft 53 are axially aligned and actuator shaft 53 is so positioned in housing 124 defined by the inner surfaces of cylindrical end portion 123 of the torque motor shaft that gases exhausting from the pair of coaxially aligned actuator shaft passages 83 and 84 will impinge on the inner cam surface 124 of cup-shaped member 123 and discharge therefrom to the exterior of the vehicle through a plurality of vent holes in actuator housing 19 (not shown).

As appears in FIGURE 5, the actuator shaft outlet passages 83 and 84 are coaxially aligned. When the servo apparatus is assembled, actuator shaft passages 83 and 84 are positioned in cup-shaped member 123 in spaced relation thereto so that the gap distance $G^1$ and gap distance $G^2$ are equal. Therefore, with gap distance $G^1$ and $G^2$ being equal, gas discharging from passages 83 and 84 respectively will have no effect on pressure conditions existing in either shaft passages 81 and 82 or vane chambers 64 and 65 when the servo system is inoperative. When gap distances $G^1$ and $G^2$ are equal, equal throttling of gases exhausting through the gaps occurs and the pressures in both passages 83 and 84 are equal. When the cup-shaped member 123 is rotated relative to the actuator shaft 53 by rotation of the torque motor shaft, the gap distance $G^1$ between the cammed inner surface 124 of the cup-shaped member and the actuator shaft increases or decreases while gap distance $G^2$ correspondingly decreases or increases. Increase in one gap distance is accompanied by decrease in the other gap distance, depending upon the direction of rotation of the cup-shaped member. It will be appreciated that the cup-shaped member need be rotated through but a small angle to vary the respective gap distances $G^1$ and $G^2$. With the gap distances $G^1$ and $G^2$ unequal, pressures in the passage 82 and 81 will be unbalanced, pressure in passage 82 decreasing and pressure in passage 81 increasing when gap distance $G^1$ increases and gap distance $G^2$ decreases. The pressure differences existing in passages 81 and 82 will be sensed in the vane compartments communicating with the respective passages 81 and 82 and cause the actuator shaft to rotate in the direction of low pressure.

Thus, in operation, hot gases will be supplied from gas generator source 24 through conduit 115 to swirl chamber 112. The hot gases will be swirled therein and any solid impurities present in the gases will be deposited in chamber 112. The impurity-free gases will then flow through radial inlet passages 101 and 102 of actuator shaft 53 into the pair of axially extending passages 81 and 82. In one direction, the gas will be supplied to the radially extending nozzled outlet passages 83 and 84 and from thence in an impinging stream against the inner surface 124 or cup-shaped member 123 and be discharged therefrom to the ambient through a plurality of vent holes in actuator housing 19 (not shown).

The gas will also flow through actuator shaft axial passages 81 and 82 in the opposite direction. In this direction, gas in passage 81 flows through the plurality of transverse passages 91 into vane chambers 64, and gas in passage 82 flows through the plurality of transverse passages 92 into vane chambers 65.

Thus, gas pressure produced in chambers 64 and 65 on both sides of vanes 58 will be in equilibrium and vanes 58 will be maintained in a stable position until a pressure unbalance is created in chambers 64 and 65. When a condition of pressure unbalance is caused in the vane chambers, the actuator shaft will rotate in the direction of low pressure. If pressure equilibrium is restored in chambers 64 and 65, actuator shaft 53 will have returned to the phase relation with torque motor shaft 121. End 89 of actuator shaft 53, as appears in FIGURE 2, may be splined to the particular vehicle flight control surface or assembly such as gimbal ring 17.

Hence, a pressure differential produced in chambers 64 and 65 will cause rotation of actuator shaft 53 and cause corresponding movement of the vehicle flight control surface.

As appears in FIGURES 2 and 5, means are provided to control pressure conditions in the vane chambers 64 and 65.

When torque motor 48 is energized from a remote source such as the vehicle autopilot system to cause rotation of torque motor shaft 121 and sleeve 122 a difference in gap distance between $G^1$ and $G^2$ occurs and thereby a corresponding pressure differential will be created in chambers 64 and 65 causing actuator shaft 53 to rotate in the direction of low pressure and in proportion to the degree of movement of the cam. Movement of cam sleeve 122 through an angle of 1° will produce movement of actuator shaft 53 through an angle of 1°. Thus the control valve provides a linear position feedback loop assuring positive movement of the actuator shaft through any desired angle within operating limits.

It will be appreciated that during operation of our servo system, thermal expansion of shaft 53 and thermal expansion of cam sleeve 123 are in the same direction, and, hence, the desired distance calibration of the cam 123 and shaft 53 is not disturbed thereby.

Furthermore, no metal-to-metal contact exists between actuation shaft 53 and cam sleeve 123 which is a desirable feature in high temperature applications. For example, there is no force back loading on the torque motor and the attendant detrimental effects on operation.

It is therefore seen from the foregoing that there is hereby provided a rotary gas actuator assembly featuring therein a plurality of chambers receiving vanes mounted by a shaft having gas flow passages therein communicating with the chambers and a gas supply source and opening in one end of the shaft in close proximity to shaft means of a motor or the like unaffected by linear expansion of the respective shafts attributable to high temperature conditions of the environment in which the rotary gas actuator assembly operates, whereby one of the passages in the actuator shaft may be essentially closed by the motor shaft to effect rotation of the actuator shaft and tilting movement for pitch and yaw control and operation of thrust reversal means, where provided.

The rotary gas actuator assembly of this invention is further characterized by means for filtering the gases being supplied to the actuator means whereby the gases utilized in the actuator shaft gas passages is substantially freed of impurities and the possibility of plugging of the actuator shaft passages is thereby minimized.

The rotary assembly disclosed is accurate and reliable in its operation, and since both the torque motor input and actuator output are rotary, the number of mechanisms required to operate effectively in hot environments are reduced. The weight requirements of the rotary actuator are substantially less than that for a linear actuator with supporting structure and cranks, and by way of example, the complete weight of a 10,000 in. lbs. hot gas actuator is approximately 6.5 pounds.

While preferred embodiments of the invention have been shown and described, various other modifications and substitution of equivalents will occur to those skilled in the art after a study of the foregoing disclosure. Hence, the disclosure should be taken in an illustrative, rather than a limiting sense, and it is the desire and intention to reserve all modifications within the scope of the sub-joined claims.

We claim as our invention:

1. A gas servo system comprising a housing having a plurality of vane chambers, a rotor in said housing having a vane in each chamber dividing the chamber into two opposed compartments, said rotor having first passages for introducing gas into all of said compartments to position the vanes and rotor in the housing, means movable with the rotor bleeding gas from said compartments including a first release opening communicating with the compartments on one side of the vanes and a second release opening communicating with the compartments on the other side of the vanes and signal responsive means for controlling the relative rates of gas flow from the first and second release openings to thereby control the relative position of the rotor in the housing.

2. A gas servo system comprising a housing having a vane chamber, a rotor in said housing having a vane in said chamber dividing the chamber into two opposed compartments, said rotor having a first passage for introducing gas to one of said compartments and a second passage for introducing gas to the opposite compartment, bleeder means for both of said passages movable with said rotor including a first discharge opening communicating with said first passage and a second discharge opening communicating with said second passage, and signal responsive means controlling the relative rate of gas flow from the first and second discharge openings to thereby control the relative position of the rotor in the housing.

3. A servo system which comprises a housing having a central rotor chamber and a plurality of vane chambers radiating therefrom, a rotor having a shaft rotatably mounted in said rotor chamber and vanes radiating from said shaft dividing each of said vane chambers into opposed compartments, said rotor having a first unrestricted passage communicating with each of the compartments on one side of the vanes and a second unrestricted passage communicating with each of the compartments on the opposite side of the vanes, means for introducing gas at the same pressure to said first and second passages, said shaft having spaced bleeder outlets communicating with said passages, and signal responsive means controlling the relative rates of flow from said bleeder outlets to thereby control the relative pressures in said opposed compartments and regulate the position of the rotor.

4. A gas servo system which comprises a housing defining a plurality of vane chambers, a rotor rotatably mounted in said housing having vanes dividing said chambers into opposed compartments, said rotor having a passaged shaft supporting the rotor in the housing, said shaft including a first passage communicating with the compartments on one side of the vanes and a second passage communicating with the compartments on the opposite side of the vanes, said housing defining a local annular chamber around said shaft, said shaft having separate inlets joining the annular chamber with said first and second passages, tangential gas inlet means for feeding actuating gas to said annular chamber for swirling the gas therein to effect centrifugal separation of impurities from the gas before the gas reaches said inlet passages, first and second bleeder outlets respectively communicating with said first and second shaft passages in spaced relation from said inlets, and signal responsive means controlling relative rate of flow from said bleeder outlets to thereby control the relative pressures in said compartments and regulate the position of the rotor.

5. In a gas servo system including a torque motor having a rotatable shaft, the improvement comprising: an actuator housing defining a plurality of vane chambers; a rotor shaft extending through said housing; means including vanes depending from said rotor shaft for separating each chamber into a pair of pressurizable compartments; means for introducing pressurizing gas into said compartments including a pair of bleeder outlet passages formed in said actuator shaft opening near one end thereof, and signal responsive means carried by said torque motor shaft for controlling the relative rate of gas flow from said bleeder outlets to thereby regulate the relative position of said rotor shaft in the housing.

6. In a gas servo system including a torque motor having a rotatable shaft, the improvement comprising: an actuator housing defining a plurality of vane chambers; a rotor shaft extending through said housing; means including vanes depending from said rotor shaft for separating each chamber into a pair of pressurizable compartments; means for introducing pressurizing gas into said compartments including a pair of passages formed in said rotor shaft and opening near one end thereof, and signal responsive means carried by said torque motor shaft including a sleeve having a cammed inner surface for controlling the relative rate of flow from said passages to thereby regulate the relative position of said rotor shaft in said housing.

7. A rotary actuator comprising a housing defining a chamber; a rotor shaft extending through said housing carrying means for separating said chamber into at least one pair of compartments; said shaft including first gas flow passages for introducing gas to said compartments to position the rotor in the housing, said housing defining a local annular chamber around said shaft; shaft formed inlet passages joining the annular chamber with said first gas passages; tangential gas inlet means for supplying gas to said annular chamber for swirling the gas therein to effect centrifugal separation of impurities from the gas before the gas enters said passages and bleeder passages communicating with said first gas passages in spaced relation from said inlet passages whereby changes in gas pressure conditions in said bleeder passages control the relative position of the rotor in the housing.

8. A servo system which comprises a housing, a rotor mounted in said housing having at least one vane separating the housing into opposed compartments, separate and unrestricted passages in the rotor opening to said compartments, means for introducing fluid under pressure directly through said rotor passages for pressurizing said compartments, bleeder outlets communicating with said passages and discharging from the rotor in spaced relation from one end of the rotor, and signal responsive means controlling the relative amounts of fluid released from said bleeder outlets to thereby control the position of the rotor in the housing.

9. A rotary actuator comprising: a housing defining a chamber; shaft means extending through said housing; means for separating said chamber into at least two pressurizable compartments including at least one vane depending from said shaft means; means for pressurizing said compartments including a pair of first unrestricted gas passages formed in said shaft means, and means for controlling pressure conditions in said compartments including a pair of spaced bleed outlets formed in said shaft means, each of said bleed outlets communicating with one of said first unrestricted gas passages and opening inwardly from one end of the shaft means.

10. A rotary actuator comprising: a housing defining a chamber; a rotor shaft extending through said housing carrying means for separating the chamber into at least one pair of compartments; first unrestricted gas passages formed in said shaft for introducing a fluid under pressure to said compartments to thereby position the shaft-carried means and rotor in said housing, and bleeder passages in the rotor shaft communicating with the first unrestricted gas passages and opening in spaced relation near one end of the shaft, whereby changes induced in pressure conditions in the bleeder passages control the relative position of the rotor in the housing.

References Cited in the file of this patent
UNITED STATES PATENTS

| | | |
|---|---|---|
| 1,876,104 | Tucker | Sept. 6, 1932 |
| 2,372,710 | Chisholm | Apr. 3, 1945 |
| 2,411,119 | Stephens | Nov. 12, 1946 |
| 2,854,956 | Hager | Oct. 7, 1958 |

FOREIGN PATENTS

| | | |
|---|---|---|
| 500,840 | Great Britain | Feb. 16, 1939 |